US012223978B2

(12) United States Patent
Saito et al.

(10) Patent No.: US 12,223,978 B2
(45) Date of Patent: Feb. 11, 2025

(54) AUDIO SYSTEM

(71) Applicant: Alps Alpine Co., LTD., Tokyo (JP)

(72) Inventors: Nozomu Saito, Fukushima (JP); Keita Tanno, Tokyo (JP)

(73) Assignee: Alps Alpine Co., LTD., Tokyo (JP)

( * ) Notice: Subject to any disclaimer, the term of this patent is extended or adjusted under 35 U.S.C. 154(b) by 188 days.

(21) Appl. No.: 17/973,651

(22) Filed: Oct. 26, 2022

(65) Prior Publication Data

US 2023/0154482 A1 May 18, 2023

(30) Foreign Application Priority Data

Nov. 12, 2021 (JP) ................................ 2021-185072

(51) Int. Cl.

*H04R 3/12* (2006.01)
*G10L 21/0232* (2013.01)
*H04R 1/26* (2006.01)
*H04S 7/00* (2006.01)
*G10L 21/0216* (2013.01)

(52) U.S. Cl.

CPC ............ *G10L 21/0232* (2013.01); *H04R 1/26* (2013.01); *H04R 3/12* (2013.01); *H04S 7/302* (2013.01); *G10L 2021/02166* (2013.01); *H04R 2499/13* (2013.01)

(58) Field of Classification Search

CPC ................................ H04R 3/12; H04S 7/302
See application file for complete search history.

(56) References Cited

U.S. PATENT DOCUMENTS

| | | | | |
|---|---|---|---|---|
| 10,854,187 | B2 | 12/2020 | Tachi et al. | |
| 2013/0034246 | A1 | 2/2013 | Kano | |
| 2015/0180436 | A1* | 6/2015 | Tassart | H03G 5/165 381/103 |

FOREIGN PATENT DOCUMENTS

| | | | |
|---|---|---|---|
| EP | 3 598 431 | | 1/2020 |
| JP | 2009100187 | * | 5/2009 |
| JP | 2020-12917 | | 1/2020 |

OTHER PUBLICATIONS

Machine translation of JP-2009100187, 13 pages (Year: 2009).*
Extended European Search Report issued Apr. 21, 2023 in corresponding European Patent Application No. 22205332.4, 10 pages.

* cited by examiner

*Primary Examiner* — Ping Lee
(74) *Attorney, Agent, or Firm* — Crowell & Moring LLP

(57) ABSTRACT

A voice output from an i-th audio source apparatus is adjusted with a frequency transfer function $W_{ii}(f)$ set in an i-th noise reduction filter and is output from an i-th speaker. In the noise reduction filter, a frequency transfer function $W_{ii}(f)$ is set in which the sound is made smaller at frequencies where the gain of the frequency transfer function $C_{im}(f)$ from the SPKi to a user tends to be relatively larger than the gain of the frequency transfer function $C_{ii}(f)$ from the SPKi to the user, and the sound is increased at frequencies where the gain of $C_{im}(f)$ tends to be relatively smaller than the gain of $C_{ii}(f)$, where m is an integer excluding i from 1 to n.

4 Claims, 3 Drawing Sheets

AUDIO SYSTEM

BACKGROUND

The present application claims priority to Japanese Patent Application Number 2021-185072, filed Nov. 12, 2021, the entirety of which is hereby incorporated by reference.

BACKGROUND

1. Field of the Disclosure

The present disclosure relates to an audio system that outputs sound of different sound sources for each user to a plurality of users.

2. Description of the Related Art

An audio system that outputs sound of different sound sources to users seated on different seats of an automobile is described in, for example, JP 2020-12917 A.

In such an audio system that outputs sound of different sound sources for each user to a plurality of users, the sound output to other users heard by each user is noise.

As a technique for reducing such a sound output toward other users that is audible to each user, a technique for controlling directivity of a sound output toward the user so that the sound does not reach other users, and an active noise control technique for outputting sound that cancels noise from a speaker is described in, for example, JP 2020-12917 A.

SUMMARY

In an audio system that outputs sound of different sound sources for each user to a plurality of users, in a case where the sounds output to other users heard by each user are reduced by the directivity control described above, a good effect can be obtained in a high frequency range (5 kHz or more), but it is difficult to obtain a sufficient effect in a band where the sensitivity of the human ear is the highest (around 2 to 4 kHz).

In addition, in the active noise control described above, it is difficult to widen a region where noise of a high frequency can be reduced, and it is difficult to obtain a sufficient effect.

Therefore, an objective of the present disclosure is to favorably reduce a sound output to another user audible to each user in an audio system that outputs sound of different sound sources for each user to a plurality of users.

In order to achieve the above objective, the present disclosure provides n sound source devices from the first to the n-th, n speakers from the 1st to the n-th, and n filters in an audio system that outputs sounds of different sound sources for each of n users from the 1st to the n-th (where n>2) users. The i-th (where i is an integer of 1 to n) filter transmits the sound output from the i-th sound source device to the i-th speaker with the set frequency transfer characteristic. In addition, the frequency transfer characteristic set for the i-th filter is a frequency transfer function in which, where m is an integer excluding i from 1 to n, the sound is made smaller at frequencies where the gain of the frequency transfer function from the i-th speaker to the m-th user is greater than the gain of the frequency transfer function from the i-th speaker to the i-th user, and the sound is increased at frequencies where the gain of the frequency transfer function from the i-th speaker to the m-th user is less than the gain of the frequency transfer function from the i-th speaker to the i-th user.

Here, in the audio system, assuming that $C_{ii}(f)$ is a frequency transfer function from the i-th speaker to the i-th user, that $C^*_{ii}(f)$ is a complex conjugate of $C_{ii}(f)$, that $C_{im}(f)$ is a frequency transfer function from the i-th speaker to the m-th user, and that $C^*_{im}(f)$ is a complex conjugate of $C_{im}(f)$, a frequency transfer characteristic $W_{ii}$ set for the i-th filter may be expressed by:

$$W_{ii}(f) = \frac{1}{1 + \sum_{\substack{m=1 \\ m \neq i}}^{n} \left( C^*_{im}(f) C_{im}(f) / C^*_{ii}(f) C_{ii}(f) \right)}$$

In addition, the audio system may be an audio system in which a frequency transfer characteristic of an adaptive filter is set as a frequency transfer characteristic in an i-th filter, the frequency transfer characteristic being obtained as a result of performing an adaptive operation in which a difference between a sound obtained by applying a frequency transfer function the same as a frequency transfer function from the i-th speaker to an i-th user to a sound output from the i-th sound source device and an output of a microphone arranged at a listening position of a sound of the i-th user and an output of the microphone located at a listening position of a sound of an m-th user are set as errors, in the adaptive filter in which the sound output from the i-th sound source device is an input and an output from the i-th speaker.

In addition, the audio system may be an audio system in which a frequency transfer characteristic of an adaptive filter is set as a frequency transfer characteristic in an i-th filter, the frequency transfer characteristic being obtained as a result of performing, in the adaptive filter having a sound output from an i-th sound source device as an input and an output as an input of an i-th speaker, an adaptive operation in which a difference between a sound obtained by applying a frequency transfer function the same as a frequency transfer function from the i-th speaker to an i-th user to a sound output from an i-th user and an output of a microphone arranged at a listening position of the sound of the i-th user is weighted by a predetermined weight and a value obtained by weighting an output of the microphone arranged at the listening position of the sound of the m-th user with a weight set for each microphone as an error.

In addition, in order to achieve the above object, the present disclosure includes n sound source devices from the 1st to the n-th, n speakers from the 1st to the n-th, and n filters in an audio system that outputs sounds of different sound sources for each of n users from the 1st to the n-th (where n>2) users. The i-th (where i is an integer of 1 to n) filter transmits the sound output from the i-th sound source device to the i-th speaker with the set frequency transfer characteristic. In addition, a user having a largest ratio of a gain of a frequency transfer function from an i-th speaker to an i-th user other than the i-th user with respect to a gain of the frequency transfer function from the i-th speaker to the i-th user is set as a focused user, and the frequency transfer characteristic set in an i-th filter is a frequency transfer function that reduces sound at a frequency at which the gain of the frequency transfer function from the i-th speaker to a focused user is greater than the gain of the frequency transfer function from the i-th speaker to the i-th user, and increases sound at a frequency at which the gain of the frequency transfer function from the i-th speaker to the focused user is less than the gain of the frequency transfer function from the i-th speaker to the i-th user.

Here, in the audio system, assuming that $C_{ii}(f)$ is a frequency transfer function from the i-th speaker to the i-th user, that $C^*_{ii}(f)$ is a complex conjugate of $C_{ii}(f)$, that the focused user is the d-th user, that $C_{id}(f)$ is a frequency transfer function from the i-th speaker to the d-th user, and that $C^*_{id}(f)$ is a complex conjugate of $C_{id}(f)$, a frequency transfer characteristic $W_{ii}$ set for the i-th filter may be expressed by:

$$W_{ii}(f) = \frac{1}{1 + \left(C^*_{id}(f)C_{id}(f)/C^*_{ii}(f)C_{ii}(f)\right)}$$

In addition, the audio system may be an audio system in which a frequency transfer characteristic of an adaptive filter is set as a frequency transfer characteristic in an i-th filter, the frequency transfer characteristic being obtained as a result of performing an adaptive operation in which a difference between a sound obtained by applying a frequency transfer function the same as a frequency transfer function from the i-th speaker to an i-th user to a sound output from the i-th sound source device and an output of a microphone arranged at a listening position of a sound of the i-th user and an output of the microphone arranged at a listening position of a sound of a focused user are set as errors, in the adaptive filter in which the sound output from the i-th sound source device is an input and an output from the i-th speaker.

Here, in the above audio system, each of the filters may be a graphic equalizer.

According to the audio system as described above, it is possible to suppress the output sound of the i-th speaker that can be heard by users other than the i-th user in a form in which the volume and audio quality of the output sound of the i-th speaker that can be heard by the i-th user are not reduced as much as possible.

As described above, according to the present disclosure, in the audio system that outputs sound of different sound sources for each user to a plurality of users, it is possible to satisfactorily reduce sounds output to other users audible to each user.

DETAILED DESCRIPTION

Hereinafter, embodiments and implementations of the present disclosure will be described.

Figure 1:
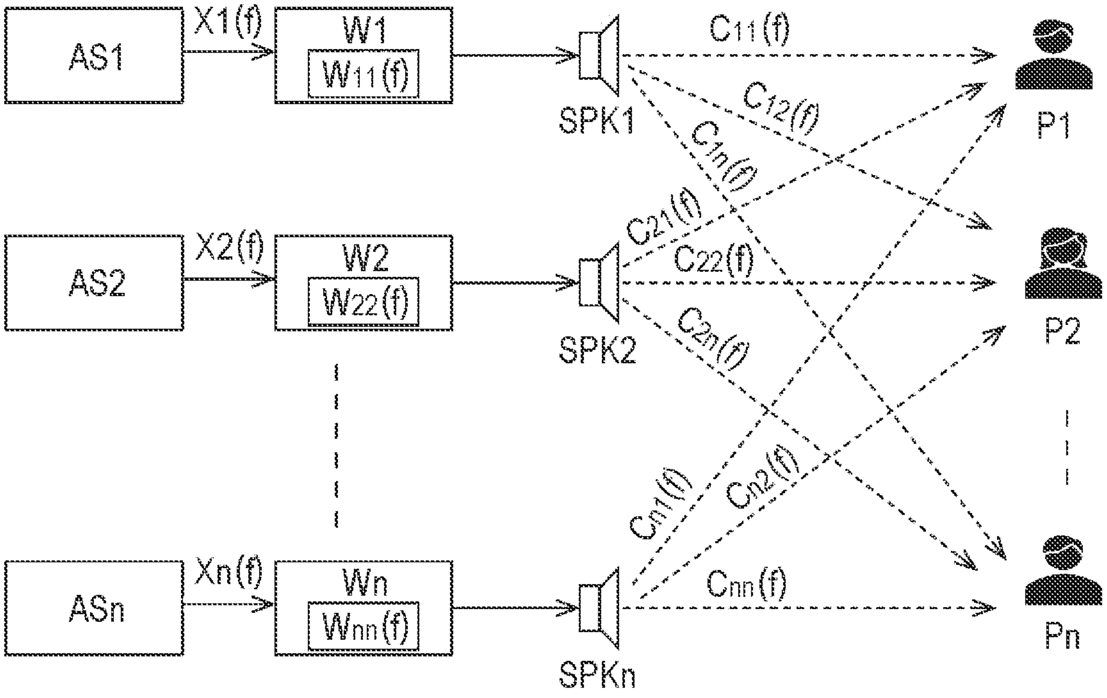
FIG. 1 is a block diagram illustrating one form of a configuration of an audio system according to an embodiment of the present disclosure.

FIG. 1 illustrates one form of a configuration of an audio system according to the present disclosure.

The illustrated audio system is an audio system that outputs sound of different sound sources for each user to n (n>2) users from P1 to Pn, and includes n audio source apparatus from AS1 to ASn, n noise reduction filters from W1 to Wn, and n speakers from SPK1 to SPKn.

Then, the i-th audio source apparatus ASi (i is an integer of 1 to n) is a device that outputs sound listened to by the i-th user Pi, and the voice Xi(f) output by the i-th audio source apparatus ASi is adjusted by the frequency transfer function $W_{ii}(f)$ set in the noise reduction filter Wi by the i-th noise reduction filter Wi and is output from the i-th speaker SPKi.

That is, for example, the second audio source apparatus AS2 is a device that outputs sound listened to by the second user P2, and the voice X2(*f*) output by the 2nd audio source apparatus AS2 is adjusted by the frequency transfer function $W_{22}(f)$ set in the noise reduction filter W2 by the 2nd noise reduction filter W2 and is output from the 2nd speaker SPK2.

Figure 2:
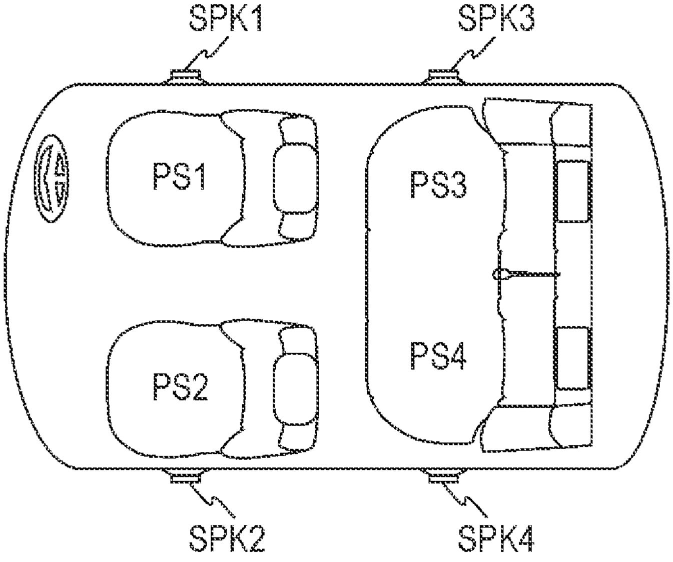
FIG. 2 is a diagram illustrating an application example of one form of the audio system according to the embodiment of the present disclosure.

For example, as illustrated in FIG. 2, the audio system is a system that outputs sound of different audio source apparatus ASi to users Pi seated on respective seats of an automobile, and the i-th speaker SPKi is disposed, for example, near the i-th seat PSi so as to emit sounds to users Pi seated on the i-th seat PSi.

That is, for example, the 2nd speaker SPK2 is disposed near a second seat PS2 so as to emit sound toward the user P2 seated on the 2nd seat PS2.

Returning to FIG. 1, when j is an integer of 1 to n, $C_{ij}(f)$ in the drawing represents a frequency transfer function of sound output from the i-th speaker SPKi to the j-th user Pj, and is a complex number whose value changes depending on the frequency f.

For example, $C_{11}(f)$ represents the frequency transfer function of the sound output from the speaker SPK1 from the 1st speaker SPK1 to the 1st user P1, and $C_{12}(f)$ represents the frequency transfer function of the sound output from the speaker SPK1 from the 1st speaker SPK1 to the 2nd user P2.

Next, in the noise reduction filter Wi, a frequency transfer function $W_{ii}(f)$ is set in which, where m is an integer excluding i from 1 to n, the frequency transfer function $W_{ii}(f)$ reduces sound at frequencies where a ratio of the gain of $C_{im}(f)$ to the gain of $C_{ii}(f)$ tends to be relatively large, and increases sound at frequencies where a ratio of the gain of $C_{im}(f)$ to the gain of $C_{ii}(f)$ tends to be relatively small, and the voice Xi(f) output from the i-th audio source apparatus ASi is adjusted by the frequency transfer function $W_{ii}(f)$ in the noise reduction filter Wi(f) and output from the i-th speaker SPKi.

More specifically, the frequency transfer function $W_{ii}(f)$ having the frequency characteristics as described above is calculated in advance based on Expression 1 indicating the tendency of the magnitude of the gain of $C_{im}(f)$ with respect to the gain of $C_{ii}(f)$, and is set in the noise reduction filter $W_{ii}(f)$. Note that X* represents a complex conjugate of X.

$$\sum_{\substack{m=1 \\ m\neq i}}^{n} \left(C^*_{im}(f)C_{im}(f)/C^*_{ii}(f)C_{ii}(f)\right) \quad \text{(Equation 1)}$$

As a result, in a case where the voice Xi(f) output from the i-th audio source apparatus ASi is directly output from the i-th speaker SPKi without providing the noise reduction filter Wi, a sound with a frequency at which the output sound from the speaker SPKi is relatively large and heard by the user Pm other than the i-th user Pi is suppressed by the noise reduction filter Wi and output from the speaker SPKi, and in a case where the sound Xi(f) output from the i-th audio source apparatus ASi is directly output from the i-th speaker SPKi without providing the noise reduction filter Wi, a sound with a frequency at which the output sound from the speaker SPKi is relatively small and heard by the user Pm other than the i-th user Pi is emphasized by the noise reduction filter Wi(f) and output from the speaker SPKi.

Therefore, by providing the noise reduction filter Wi, the output sound of the speaker SPKi reaching the users Pm other than the i-th user Pi becomes relatively small, and thus, it is possible to reduce the output sound of the speaker SPKi that can be heard by the users Pm other than the i-th user Pi in a form in which the volume and the audiometric quality of the output sound of the speaker SPKi that can be heard by the i-th user Pi are not reduced.

To illustrate, in the 1st noise reduction filter W1, a frequency transfer function $W_{11}(f)$ is set in which, where m is an integer of 2 to n, the frequency transfer function $W_{11}(f)$ reduces sound at frequencies where the gain of $C_{1m}(f)$ obtained by Expression 1 tends to be larger than the gain of $C_{1m}(f)$, and increases sound at frequencies where the gain of $C_{1m}(f)$ obtained by Expression 1 tends to be smaller than the gain of $C_{11}(f)$. The voice X1($f$) output from the 1st audio source apparatus AS1 is adjusted by the frequency transfer function $W_{11}(f)$ in the noise reduction filter W1($f$) and output from the 1st speaker SPK1.

As a result, as compared with the case where the noise reduction filter W1 is not provided, the output sound of the speaker SPK1 reaching the users Pm other than the 1st user P1 becomes relatively small, and the output sound of the speaker SPK1 leaking to the users Pm other than the 1st user P1 can be reduced in a form in which the volume and the audible quality of the output sound of the speaker SPK1 that can be heard by the 1st user P1 are not reduced as much as possible.

Next, an operation of calculating the frequency transfer function $W_{ii}(f)$ set to the noise reduction filter Wi will be described.

Hereinafter, the operation of calculating the frequency transfer function $W_{ii}(f)$ will be described using the calculation of the frequency transfer function $W_{11}(f)$ set in the noise reduction filter W1 as an example.

Figure 3:
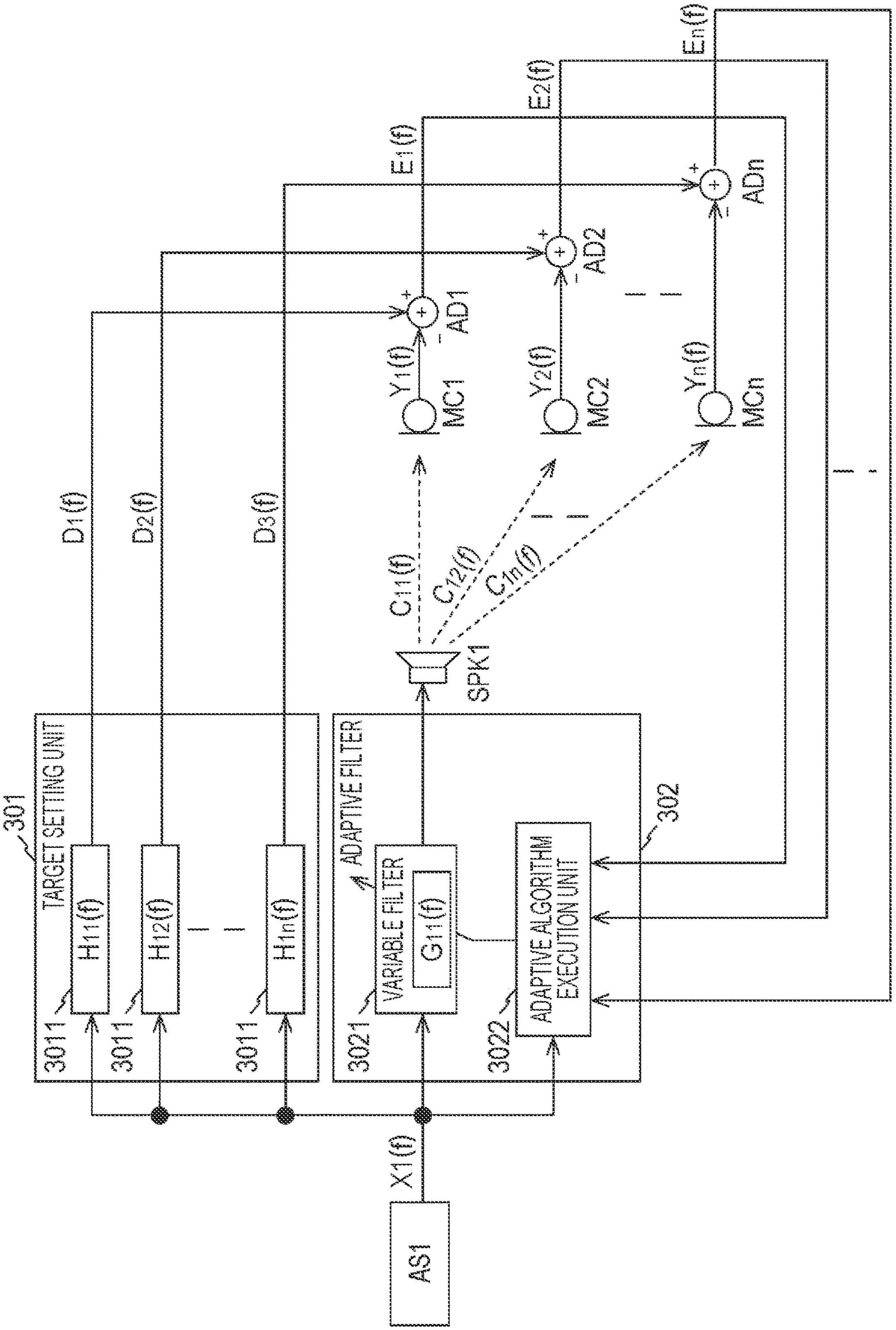
FIG. 3 is a diagram illustrating one form of a configuration of learning of a transfer function of the noise reduction filter according to the embodiment of the present disclosure.

The calculation of the frequency transfer function $W_{11}(f)$ is performed in advance in the configuration illustrated in FIG. 3.

As illustrated, this configuration includes an audio source apparatus AS1, a target setting unit 301, an adaptive filter 302, n microphones from speakers SPK1 and MC1 to MCn, and n subtractors from AD1 to ADn.

The i-th microphone MCi is disposed at the listening position of the sound of the i-th user Pi.

The target setting unit 301 includes n filters 3011 having an output X1($f$) of the audio source apparatus AS1 as an input, and a frequency transfer function $H_{1i}(f)$ from the target speaker SPK1 to the i-th user Pi is set in the i-th filter 3011.

The adaptive filter 302 includes a variable filter 3021 having the output X1 ($f$) of the audio source apparatus AS1 as an input and an adaptive algorithm execution unit 3022, and the output of the variable filter 3021 is output from the speaker SPK1.

The i-th adder ADi subtracts the output $Y_i(f)$ of the i-th microphone MCi from the output $D_i(f)$ of the i-th filter 3011 in which the frequency transfer function $H_{1i}(f)$ is set, and outputs the result to the adaptive filter 302 as an i-th error $E_i(f)$.

The adaptive algorithm execution unit 3022 of the adaptive filter 302 executes a predetermined adaptive algorithm such as Multiple Error Filtered-X LMS (MEFX LMS), and performs an adaptive operation of updating the frequency transfer characteristic $T_{11}(f)$ of the variable filter 3021 so as to minimize the sum of the individual powers of the n error signals output from the n arithmetic units AD1-ADn, that is, the error signals E1($f$) to En(f).

Then, in such a configuration, the adaptive algorithm execution unit 3022 is caused to perform the adaptation operation while causing the audio source apparatus AS1 to output X1($f$), and when the frequency transfer characteristic $G_{11}$ of the variable filter 3021 converges, the converged frequency transfer characteristic $G_{11}$ is set as the frequency transfer function $W_{11}(f)$ to be set for the noise reduction filter W1.

Here, the frequency transfer function $C_{11}(f)$ from the actual speaker SPK1 to the 1st user P1 may be set as the frequency transfer function from the target speaker SPK1 to the 1st user P1, and the frequency transfer function $C_{11}(f)$ may be set as the frequency transfer function $H_{11}(f)$ of the 1st filter 3011 of the target setting unit 301. Further, when m is an integer of 2 to n, the frequency transfer function from the target speaker SPKm to the m-th user Pm may be set as the frequency transfer function of gain 0 for all frequencies, and the frequency transfer function Him of the second and subsequent filters 3011 may be set to gain 0 for all frequencies.

In this manner, in a case where the frequency transfer function $C_{11}(f)$ is set as the frequency transfer function $H_{11}(f)$ and the frequency transfer function Him of the second and subsequent filters 3011 is set to be the gain 0 for all frequencies, the calculated frequency transfer function $W_{11}(f)$ is as shown in Expression 2.

$$W_{11}(f) = \frac{1}{1 + \sum_{m=2}^{n} \left( C_{1m}^{*}(f) C_{1m}(f) / C_{11}^{*}(f) C_{11}(f) \right)} \quad \text{(Equation 2)}$$

Note that the frequency transfer function $C_{11}(f)$ from the actual speaker SPK1 to the 1st user P1 set as the frequency transfer function $H_{11}(f)$ may be tuned in advance.

The calculation of the frequency transfer function $W_{11}(f)$ set for the 1st noise reduction filter W1 has been described above.

Here, the frequency transfer function $W_{ii}(f)$ set to the arbitrary noise reduction filter Wi can also be similarly calculated by changing the order such that the i-th becomes the 1st and applying the above configuration and operation, and the expression of the frequency transfer function $W_{ii}(f)$ set to the noise reduction filter Wi corresponding to Expression 2 is expressed by Expression 3 with i.

$$W_{ii}(f) = \frac{1}{1 + \sum_{\substack{m=1 \\ m \neq i}}^{n} \left( C_{im}^{*}(f) C_{im}(f) / C_{ii}^{*}(f) C_{ii}(f) \right)} \quad \text{(Equation 3)}$$

Figure 4:
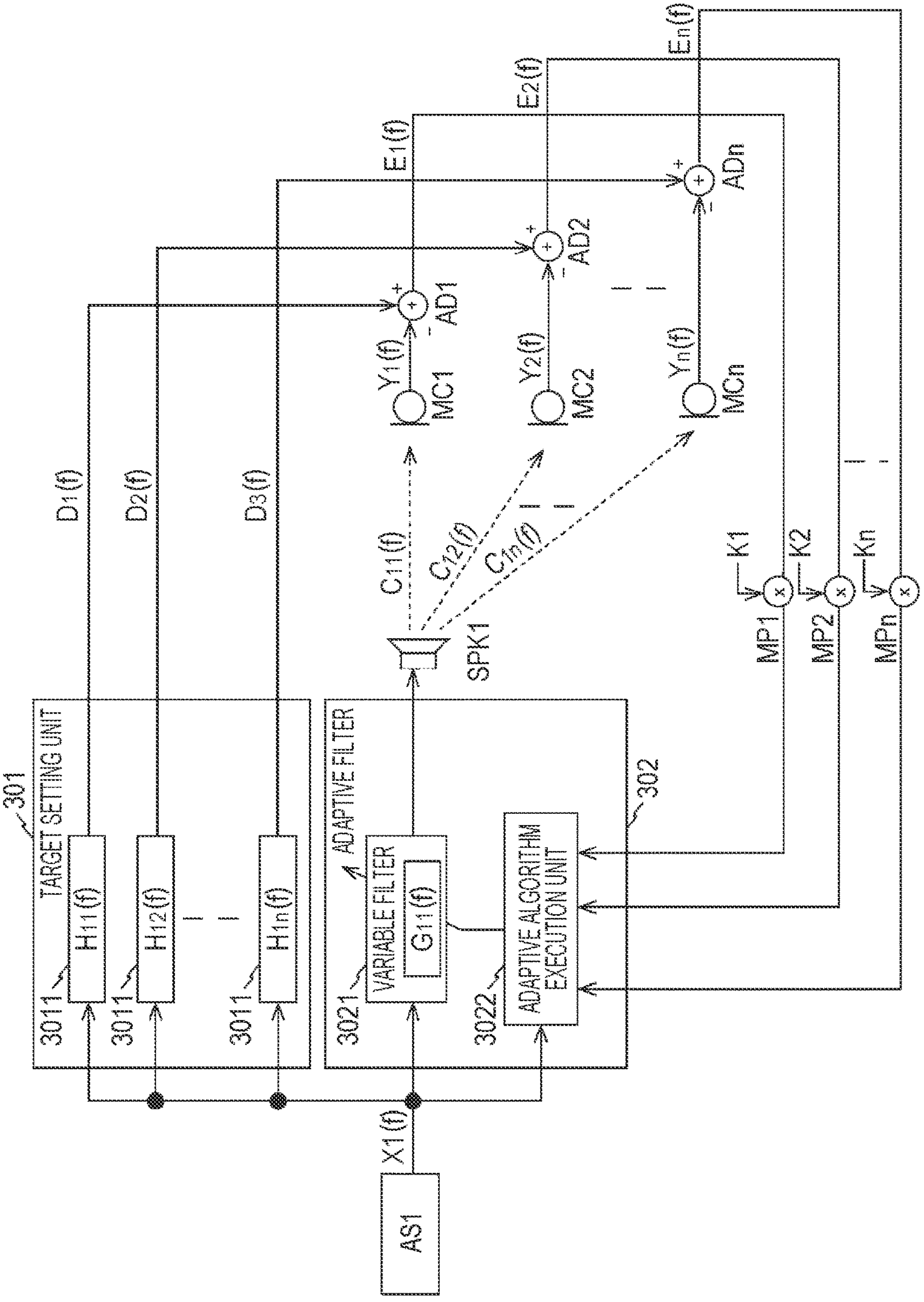
FIG. 4 is a diagram illustrating another form of a configuration of learning of a transfer function of the noise reduction filter according to the embodiment of the present disclosure.

In the calculation of the frequency transfer function $W_{11}(f)$ of the 1st noise reduction filter W1 as described above, a multiplier from MP1 to MPn may be provided as illustrated in FIG. 4, and the multiplier MPi may multiply the error $E_i(f)$ output from ADi by the weight Ki and output the result to the adaptive filter 302.

Furthermore, in this case, m at which C1m*(f) C1m(f)/C11*(f) C11(f) is maximized is defined as d, and the weight Ki of the error i (f) other than the error Ed(f) and the error E1(f) may be set to 0. In this case, the weights Kd and K1 of the error Ed(f) and the error E1(f) may be 1.

In this case, the calculated frequency transfer function $W_{11}(f)$ is expressed by Expression 4.

$$W_{11}(f) = \frac{1}{1 + \left(C_{1d}^*(f)C_{1d}(f)/C_{11}^*(f)C_{11}(f)\right)} \quad \text{(Equation 4)}$$

By doing so, it is possible to most effectively reduce the output sound of the speaker SPK1 audible to the user Pd who hears the output sound of the speaker SPK1 leaking the most. In addition, the processing amount of the adaptive operation of the adaptive algorithm execution unit 3022 necessary for the calculation of the frequency transfer function $W_{11}(f)$ can also be reduced.

Here, similarly for any noise reduction filter Wi, m at which Cim*(f) Cim(f)/Cii*(f) ii(f) is maximized may be defined as d, the weight Km of the error Em (f) other than the error Ed (f) and the error Ei(f) may be defined as 0, and the weights Kd and Ki of the error Ed(f) and the error Ei(f) may be defined as 1. In this case, the expression of the frequency transfer function $W_{ii}(f)$ set for the noise reduction filter Wi corresponding to Expression 4 is Expression 5.

$$W_{ii}(f) = \frac{1}{1 + \left(C_{id}^*(f)C_{id}(f)/C_{ii}^*(f)C_{ii}(f)\right)} \quad \text{(Equation 5)}$$

Forms of an embodiment of the present disclosure have been described.

Here, since the action of the noise reduction filter Wi in the above embodiment is adjustment of the gain for each frequency of the voice Xi (f) output by the i-th audio source apparatus ASi, a graphic equalizer that adjusts the gain for each frequency band such as for each ⅓ octave band may be used as the noise reduction filter Wi.

Although embodiments and implementations of the present disclosure have been described in detail above, the present disclosure is not limited to the specific embodiments, and various modifications and changes can be made within the scope of the disclosure set forth in the claims. Therefor, it is intended that this disclosure not be limited to the particular embodiments disclosed, but that the disclosure will include all embodiments and implementations falling within the scope of the appended claims.

The invention claimed is:

1. An audio system configured to output sound of different sound sources for each of n users from a 1st user to an n-th user, where is n>2, the audio system comprising:

n sound source devices from the 1st to the n-th;

n speakers from the 1st to the n-th; and n filters, wherein the i-th filter, where i is an integer of 1 to n, is configured to transmit a sound output from the i-th sound source device to the i-th speaker with a set frequency transfer characteristic;

wherein the frequency transfer characteristic set for the i-th filter is a frequency transfer function for reducing sound at a frequency at which a gain of a frequency transfer function from the i-th speaker to the m-th user is greater than a gain of a frequency transfer function from the i-th speaker to the i-th user, and increasing sound at a frequency at which of a gain of a frequency transfer function from the i-th speaker to the m-th user is less than a gain of a frequency transfer function from the i-th speaker to the i-th user, where m is an integer excluding i from 1 to n; and wherein when $C_{ii}(f)$ is a frequency transfer function from the i-th speaker to the i-th user, $C^*_{ii}(f)$ is a complex conjugate of $C_{ii}(f)$, $C_{im}(f)$ is a frequency transfer function from the i-th speaker to the m-th user, and $C^*_{im}(f)$ is a complex conjugate of $C_{im}(f)$, a frequency transfer characteristic $W_{ij}$ set for the i-th filter is expressed by the equation:

$$W_{ii}(f) = \frac{1}{1 + \sum_{\substack{m=1 \\ m \neq i}}^{n} \left(C_{im}^*(f)C_{im}(f)/C_{ii}^*(f)C_{ii}(f)\right)}.$$

2. The audio system according to claim 1, wherein a frequency transfer characteristic of an adaptive filter is set as a frequency transfer characteristic in an i-th filter, the frequency transfer characteristic being obtained as a result of performing an adaptive operation in which a difference between a sound obtained by applying a frequency transfer function the same as a frequency transfer function from the i-th speaker to an i-th user to a sound output from the i-th sound source device and an output of a microphone arranged at a listening position of a sound of the i-th user, and an output of the microphone arranged at a listening position of a sound of an m-th user are set as errors, in the adaptive filter in which the sound output from the i-th sound source device is an input and an output from the i-th speaker.

3. The audio system according to claim 1, wherein a frequency transfer characteristic of an adaptive filter is set as a frequency transfer characteristic in an i-th filter, the frequency transfer characteristic being obtained as a result of performing, in the adaptive filter having a sound output from an i-th sound source device as an input and an output as an input of an i-th speaker, an adaptive operation in which a difference between a sound obtained by applying a frequency transfer function the same as a frequency transfer function from the i-th speaker to an i-th user to a sound output from an i-th user, and an output of a microphone arranged at a listening position of the sound of the i-th user is weighted by a predetermined weight and a value obtained by weighting an output of the microphone arranged at the listening position of the sound of the m-th user with a weight set for each microphone as an error.

4. The audio system according to claim 1, wherein each of the filters is a graphic equalizer.

* * * * *